No. 632,678. Patented Sept. 5, 1899.
H. DOCK.
TOOL FOR CUTTING SCREW THREADS.
(Application filed June 6, 1898. Renewed May 20, 1899.)
(No Model.) 2 Sheets—Sheet 1.
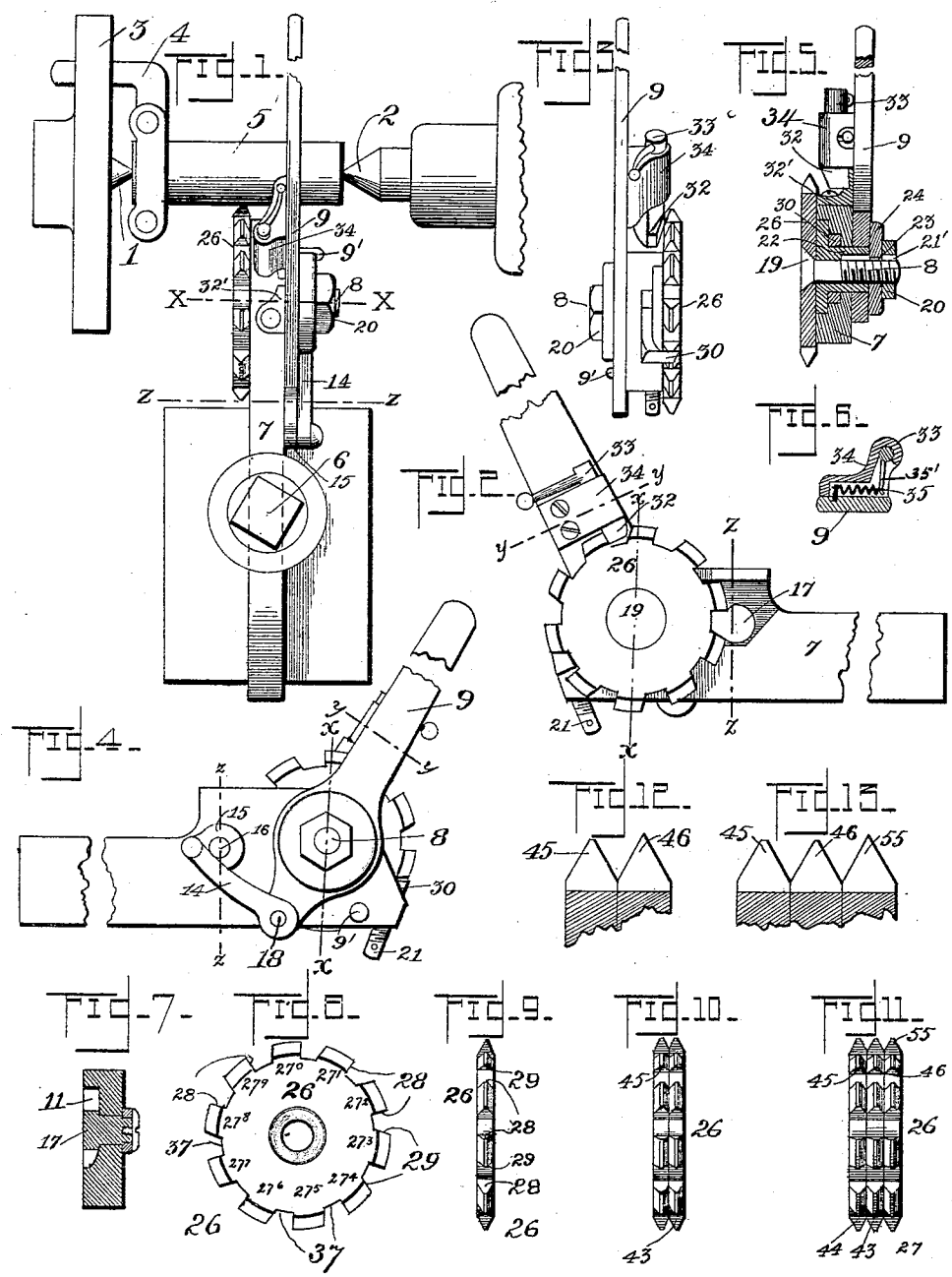
WITNESSES:
INVENTOR No. 632,678. Patented Sept. 5, 1899.
H. DOCK.
TOOL FOR CUTTING SCREW THREADS.
(Application filed June 6, 1898. Renewed May 20, 1899.)
(No Model.) 2 Sheets—Sheet 2.
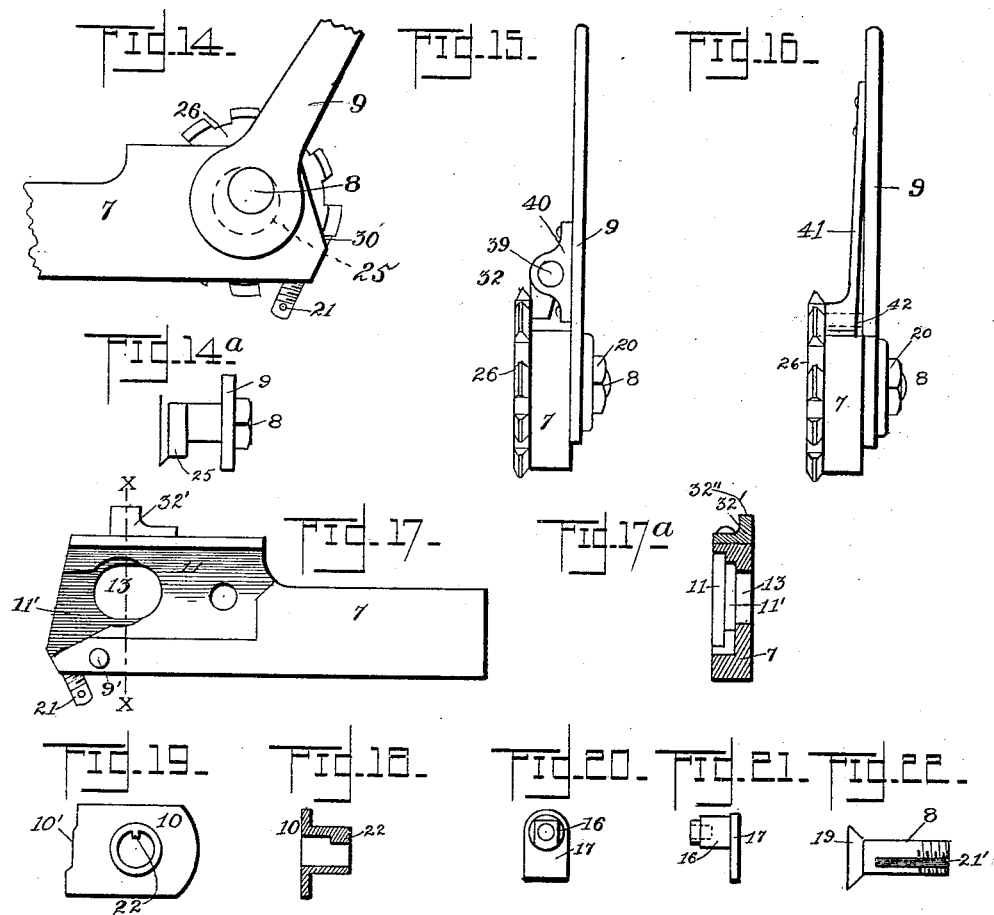
WITNESSES:
C R Morgan
A. A. Morgan
INVENTOR
Herman Dock
by [signature]
Atty.

UNITED STATES PATENT OFFICE.

HERMAN DOCK, OF PHILADELPHIA, PENNSYLVANIA.

TOOL FOR CUTTING SCREW-THREADS.

SPECIFICATION forming part of Letters Patent No. 632,678, dated September 5, 1899.

Application filed June 6, 1898. Renewed May 20, 1899. Serial No. 717,644. (No model.)

*To all whom it may concern:*

Be it known that I, HERMAN DOCK, a citizen of the United States, residing at Philadelphia, Pennsylvania, have invented a new and useful Tool for Cutting Screw-Threads, of which the following is a specification.

This invention relates to cutting-tools and means for actuating the same for threading screws in engine-lathes, my invention having for its object to cut screw-threads of superior accuracy with greater celerity, my improved tool in practice being very durable and retaining its cutting edge in working condition for the maximum of time.

Screw-threads are now commonly cut in engine-lathes by a tool having but one cutting-point, said tool being adjusted after each cut to enable it at its next operation to make a deeper cut. In this way the tool besides becoming unduly heated is so dulled by reason of making these repeated cuts that when the final or finishing cut is to be made the cut at which the tool should be sharpest to do the best work is dull, and as a result the final cut is not a smooth cut as it should be. By the use of the single tool adjusted to make its series of cuts it is very difficult, if not impossible, to secure the proper perfection of form and accuracy of pitch of the threads, for when the final or finishing cut is to be made the cutting edge of the tool is in its worst condition rather than in its best condition, as it should be for the final cut. To remove a tool of this usual class and sharpen it, necessitates, from the unavoidable change of its dimensions, a new adjustment, or to apply another tool and adjust it involves very considerable delay, during which time the change of temperature in the material being screw-threaded makes an appreciable change in the length of the screw, and in long screws, such as are required for the leading-screws of engine-lathes, this change is very perceptible, and in precise machines it is fatal. The continued use of the same cutting edge of a tool throughout the entire operation of making a long screw is only, if at all, practicable at such low velocities of work as to be unremunerative and even then the best perfection as to accuracy of the thread is not attained. To obviate these difficulties, I have provided a tool (shown as a disk) having extended therefrom a series of cutters and preferably formed integrally therewith, (but they may be made separately from the disk and firmly inserted or attached thereto,) one cutter for each cut to be made in the production of the completed screw-thread, said cutters being of progressively different lengths and arranged in series, each cutter of the series when brought into operation effecting a slightly deeper cut, the work of cutting the thread being thus apportioned to the series of cutters, so that the cutters are not overheated or unduly dulled, and so that undue stresses on the material or work are avoided. The disk and cutters constitute a tool, and by making the cutters integral with or rigidly attached to the disk, the cutters being defined or outlined clearly for the work intended, they may always be made to occupy the same relative positions, and they may be ground when dulled without changing the relations of the several cutters of the series, one with relation to the other or in relation to their points of support when in action.

My improved tool is mounted rotatively on a pivot, having combined with it suitable means to impart to the pivot and tool a defined to-and-fro and to the tool a rotative movement with the relation to the work between each cut made in the production of the screw-thread. While the tool is in operation, the heel of the cutter is supported firmly on a rest, and the tool is securely locked in place by means of a locking device. The rest, without any intermediate change of adjustment, coöperates in succession with each cutter, each cutter standing one after the other upon it in the series of notches in the disk between the cutters, the sides of said notches constituting one side a heel or supporting face for one cutter and the other side the acting face of an adjacent cutter, the dimensions from the acting face of each cutter to its heel being uniform throughout the series. A cutter having completed one of the series of cuts to be made in the production of the screw-thread the tool is moved away from the work, it during such movement retiring from the rest, and as the tool is again returned toward the work for another cut said tool is rotated sufficiently to bring another cutter into proper cutting plane, and this partial rotation having been effected the notched part of the cutter in the final movement of the tool toward the work is again made to engage the rest referred to, which operates as a stop, so that when the cutter fully arrives in correct position for cutting its heel is brought against the rest and the cutter is firmly locked in place, and it remains locked throughout the operation of the cutter.

The accuracy of the screw-thread made by my invention is secured by and wholly dependent upon the operation of the tool, irrespective of the skill of the workman. Each cut of different depth is made by a separate cutter, and faulty work due to inaccurate adjustment of a cutter by a careless workman is impossible.

The series of cutters of my improved tool are, as stated, of different length, and the peripheral edge of each cutter of the series is of uniform width from the acting edge of the cutter to its heel; but for producing V-shaped threads the width of the several cutters at their peripheral edges varies throughout the series, the peripheral edge of the last cutter to act being very much narrower than the peripheral edge of the first cutter to act in the production of the completed screw-thread.

The following is a sufficiently full, clear, and exact specification of the construction and operation of my invention to enable others skilled in the art to make and use the same, reference being had to the accompanying drawings, and reference ordinals marked thereon, in which—

Figure 1 is a plan view of my novel tool applied to work in an engine-lathe, the drawings showing parts of the lathe immediately supporting the tool and the work. Fig. 2 is a front elevation of the tool. Fig. 3 is a right-side elevation thereof. Fig. 4 is a left-side elevation thereof. Fig. 5 is a section in a plane indicated by the line $x\,x$ in Figs. 1 and 4, looking in the direction of the arrows. Fig. 6 is a section in the plane indicated by the line $y\,y$ in Figs. 2 and 4. Fig. 7 is a section in the plane indicated by the line $z\,z$ in Figs. 1, 2, and 4. Fig. 8 is a detached side view of the tool. Fig. 9 shows the tool in edge view. Figs. 10 and 11 are top views of modified forms of cutting-tool with duplex and triple cutters. Figs. 12 and 13, respectively, are enlarged views of the cutters shown in Figs. 10 and 11. Figs. 14 and 14$^a$ show a modified form of the parts for retracting and advancing the pivot and tool from and toward the work. Figs. 15 and 16 show modifications of the pawl for rotating the tool. Figs. 17 and 17$^a$ respectively show the tool-stock separately in left-side view and in transverse section in the plane indicated by the line $x\,x$ in Figs. 1 and 2. Figs. 18 and 19 respectively show in section and side view the bearing of the pivot or bolt. Figs. 20 and 21 respectively show in top and side view the arbor and lever for locking the tool in engagement with the work. Fig. 22 shows separately the bolt for pivotally supporting the tool. Fig. 23 shows separately the pawl for turning the tool and a section of the bearing supporting it. Fig. 24 shows a projection of the screw-cutting faces for producing V-shaped threads, and Fig. 24$^a$ a like projection for producing square threads. Figs. 25 and 26 respectively show in elevation and section the washer for holding the lever-handle in position in its pivotal bolt. Figs. 27 and 28 respectively show in front and end view the rest for supporting the cutters.

Referring to the drawings, Figs. 1 to 5, 1 represents the head-stock center of an engine-lathe; 2, the tail-stock center; 3, the face-plate, and 4 the carrier transmitting rotary motion to a cylindric bar 5, held between the centers 1 and 2 to be screw-threaded. The tool-post 6 is supported and may be moved in usual manner by a carriage and leading-screw operated by usual gearing connected with the arbor of the lathe. The tool-post 6 receives the stock 7, used to support the novel tool 26, to be hereinafter described.

The stock 7 sustained in the tool-post is provided with a guideway 11 and with a slot 13. (See Fig. 17.) The guideway receives a movable bearing or slide 10, (shown separately in Figs. 18 and 19,) which slides in the guideway 11. (Shown in Figs. 17 and 17$^a$.) This bearing or slide 10 receives and supports a bolt or pivot 8, having a head 19, the bolt receiving upon it the tool 26, fitted rotatably thereon, said bolt being extended through the bearing or slide and the slot referred to and taking its seat in a lever 9. The lever 9 has a stud 18 at one end beyond the bolt 8, which pivotally fits a link 14, said link being pivotally connected at its other end with the rocker-arm 15, suitably secured to a rock-shaft 16, having its bearing in the stock 7, said rock-shaft having at its opposite end an attached dog 17, (see Fig. 7 and Figs. 20 and 21 in section,) said dog when said lever 9 and rocker-arm 15 are in the position shown in Figs. 1, 3, 4, and 7 bearing against the rear surface 10′ of the bearing or slide 10, said dog 17 at such time constituting a locking device holding the bearing or slide in its extreme forward position with one of the cutters of the tool in operative condition with relation to the work.

The stock 7 has a projection 9′, (see Figs. 1, 2, and 17,) against which acts at times the short arm of the lever 9—viz., the arm extended beyond the bolt 8 and having the stud to which is attached the link 14—the said projection 9′ at times acting as a fulcrum for the said lever, as when the said lever in its movements is made to slide the bolt 8 away from the work, the stud 18 acting as the fulcrum for said lever when the lever is in its movement toward the work, it having rotated the tool, is carrying said tool forward to contact with the work, the dog 17 at such time, by its action against the surface of the said bearing or slide, temporarily locking in place the arm 15, so that it forms temporarily a fulcrum for the lower end of the link 14, the final forward movement of the lever to slide the heel of the cutter against the rest 30, hereinafter described, bringing the dog 17 onto the surface 10' of the bearing or slide 10, so as to hold the said slide locked forward during the operation of the particular cutter then put into position.

The bolt 8 (see Fig. 22) is threaded to receive a nut 20, said bolt being splined at 21' to receive a feather 22, extended from the bearing or slide. Between the nut referred to and the lever the bolt has applied to it a washer 24, having a feather 23, to also enter the spline 21', such construction preventing the bolt from turning with the lever 9.

The stock 7 has a projecting pin 9', (shown in Figs. 1, 2, and 17,) against which the front edge of the lower short arm of the lever 9 contacts and acts as a fulcrum to the lever 9, so that when the upper end of the lever 9 is pressed backwardly from the work it slides the bolt 8 and cutter 26 away from the work, and at the same time the pivot 18 draws the link 14 and rock-arm 15 forward, raising the dog 17 clear of the rear end of the slide 10, permitting the slide 10 to retreat and the cutter 26 to retreat from engagement with the work. The reversed motion of the lever 9 pushes the bolt 8, slide 10, and the cutter 26 toward the work and turns the dog 17 into position to abut solidly against the back end 10' of the slide 10, holding the slide firmly in position for engagement of the cutter 26 in the work. During the motion of the lever 9, slide 10, and cutter 26 just described the cutter $26^b$ is turned upon the bolt 8 by a pawl, as hereinafter described, and when turned so presents another cutting-point for operation. The heel of the cutting-point is rested upon a support, as hereinafter fully described. The stock has a set-screw 21 to act on the said rest to thereby correctly adjust the position and support the rest to receive the heel of each cutter of the tool to be described, the said rest when once adjusted acting uniformly to maintain the tool in any of its operative positions.

As shown in the modified form in Fig. 14, the bolt 8 is formed with an eccentric 25 and turns with a lever 9 and fits and turns in a circular bearing formed in the stock 7, the eccentric acting to move and hold the bolt 8 in its moving and in fixed positions.

The tool 26, carried by the bolt 8, (see Figs. 8 and 9,) has its peripheral edge beveled to present in cross-section the profile of the intended thread-space, and said edge is cut or notched at 37 to leave a series of integral projecting cutters or teeth $27^0$, $27'$, $27^2$, $27^3$, $27^4$, $27^5$, $27^6$, $27^7$, $27^8$, and $27^9$ with the spaces between. The acting faces of each of these cutters is marked 28, each face being radial, or approximately so, with relation to the disk, said faces, in connection with the profile surface referred to, presenting the suitable or desired cutting angles or edges. Each notch or space presents at one side thereof a surface 29, all of said surfaces being equidistant from the surfaces 28, the surfaces 29 constituting heels which bear upon and coöperate with the rest 30 to retain the tool fixedly in position when each of the several cutters is acting to do its work to cut its groove in the work. As the distance from the acting face to the heel of each cutter is uniform and the heels stand all in the same angle, a single adjustment of the rest 30 serves for all the cutters. The several cutters of the series $27^0$ $27'$, &c., are made successively of different radial lengths, so that each of said cutters to come into operation may make a deeper cut than the one preceding it; but in some cases the difference in the depth of this cut may be less between the two last cutters to operate than between the first cutter to operate and the cutter following it. When the cutters vary slightly in length and each cutter forms a defined cut in the production of the interspace of the screw-thread, the cutters, the lathe, and the material being operated upon are never subjected to such stresses or strains as to spring or twist the work aside, and thus impair the pitch of the screw to be made. By making the last cutter to act of but slightly greater length than the preceding cutter a superior accuracy of finish of the final cut may insured both as to dimensions and smoothness of the surface, for the less the material removed in the cut the smoother the surface which will be left. Each cutter has a peripheral edge extending from the acting face of the cutter to its heel, and said face for the best results is uniform in width from the acting face to the heel; but the peripheral portion of these several cutters to produce V-shaped threads vary in width one after the other, (see Fig. 24,) it being understood that each cutter is to cut into the work a little deeper than the one preceding it, each successive cut shaping and defining more definitely the bottom of the screw-thread to be made. For producing square threads the form shown in Fig. $24^a$ is used.

The lever 9 has a pawl 32 attached thereto, which engages the notches 37 between the series of cutters described. As the lever 9 is moved in the direction to withdraw the bearing or slide, the bolt, and the tool from the work, the spaces 37 are retracted and disengaged from the rest 30, and at the same time the pawl 32, carried by said lever 9, enters a new notch or space in the periphery of the tool, so that thereafter as the said lever 9 is again moved in the opposite direction the said pawl 32 is in engagement with the acting face of a cutter, and during the first part of said movement of said lever the pawl 32 acts on the face of said cutter to rotate the cutter the space of one tooth about the bolt 8, and thereafter, the said rotation having been effected, the said lever in its further movement effects a longitudinal movement of the bearing or slide 10 in the guideway 11 of the stock 7 and causes the heel of the cutter next to operate to contact with the rest 30 and slide onto the said rest and sufficiently beyond it, so that the profile of the cutting edge of said cutter stands beyond the said rest 30 in position to act upon and do its portion of the work in the production of the screw-thread. As the lever 9 reaches its final position toward the work, as described, the dog 17 comes into position on the surface 10' of the bearing or slide 10 and forms a rigid abutment or locking device, the tool then being held by the bolt 8, the rest 30, and dog 17 in accurate adjustment to restrain any longitudinal motion of the bearing or slide or tool away from the work while the cutter is acting.

As shown in Figs. 1, 2, 3, 4, and 5, (see also Fig. 23,) the pawl 32 referred to is connected with an upright arbor 33, located on a bearing 34, attached to the lever 9, a suitable spring 35, secured to said lever 9 and to a projection 35' on said arbor, (see Figs. 6 and 23,) serving to press the pawl 32 normally toward the tool, so as to engage the notches 37 between the cutters. The stock 7 has fixed to it a block 32', having a cam-surface 32", against which a tail of the pawl 32 acts as the tool arrives in its operative position, the contact of said tail with said cam-surface turning the pawl 32 aside and disengaging it from the acting face of the cutter with which it just operated. This cam-surface 32" retains the pawl 32 out of operation while the lever is in its extreme forward position, but shortly after the said lever has been started upon its outward movement the tail of the pawl retires from the cam-surface 32", letting the spring 35 force the pawl against the side of the cutter with which it is next to coöperate, and finally the pawl passes the face of said cutter and is thrown into the space ready to engage the said cutter when the movement of the lever is reversed.

Fig. 15 shows a modification of this invention wherein the pawl marked 32 turns on a horizontal arbor 39, journaled in a bearing 40 of the lever 9, and in Fig. 16 the pawl shown is formed on the lower end of a spring 41, secured to the side of the lever 9, the pawl being guided by a dowel 42, inserted and fastened in the lever 9, on which the pawl can slide freely toward and from the lever 9 as it engages and disengages from the notches in the cutter 26, but compels the pawl to move with the lever 9 as it is reciprocated downward from the work. In these last two described forms the locking action between the surface of the pawl and the surface of the tool is avoided. The resulting effect of drawing the tool step after step to bring one after the other of said cutters into operative position is the same in each case.

Figs. 10 and 11 show modified forms of tools, and in these forms the several series of cutters on the tools 43 and 44 are like those marked 26 previously described and are so constructed and combined as to act simultaneously, the cutters being so proportioned as to their length that each cutter cuts a less amount or makes a thinner chip. The cutters of the tools 43 and 44 are made, preferably, separate from the tool 26 and securely attached thereto to coöperate with it. These cutters are shown attached to the side of the tool 26, and they rotate and coact with it, serving to subdivide the metal removed into thinner layers or chips, thus diminishing the stress upon each cutter, the resistance to the action of the cutters being approximately in the ratio of the square of the thickness of the chip. These tools 43 and 44 are preferably for facility of manufacture made separately from the cutter 26, but may be formed integrally therewith. Cutting-points of the tool are shown in enlarged scale in Figs. 12 and 13.

Figs. 24 and 24$^a$ are projections of the outlines of the several notched points of the tool, drawn, however, on an enlarged scale, that marked 45 cutting first and taking off a broad thin chip at the time when the material 5 has its full diameter. That marked 46 takes a narrower chip of smaller thickness, the bar having been reduced, and so on until the apex 55 is reached, when a minimum shaving is taken, leaving the work in finished condition. During this operation all undue torsional stress and springing or permanent torsion of the material are avoided and substantially perfect accuracy of pitch is attained or effected for the finished screw.

To sharpen the tool, the heels (all uniform in shape, as stated) may be suitably supported and the surface 28, constituting the acting face of each cutter, (see Fig. 8,) may be ground to a gaged height from the heel, and owing to the peripheral portion of each tool being of exactly the same thickness from the cutting edge to the heel it will be obvious that the grinding of the cutter in no way modifies or changes its shape to at all interfere with the shape of the groove to be made by the cutter.

The surfaces of the cutters are of regular geometric form and the tool is susceptible of being cheaply and accurately produced and finished by mechanical grinding after the hardening and tempering processes, and consequently the tools are capable of exact verification as to accuracy and this being done by machinery entirely independent of manual skill. When the tool is put in use and it has been once properly adjusted, the operations of forming the screw-thread may be done without any further attention than simply to move the lever back and forth, and there is no perceptible delay between the operation of one and the next cutter of the tool.

Each cutter, it will be understood, has only a limited and moderate amount of work to perform, and to do this work it is not kept in operative position long enough for it to become injuriously heated, and each cutter once used to make a cut has ample opportunity to cool before it is again called into operation, and consequently owing to this facility of having a cutter of proper temperature always ready for use it becomes practical to rotate the work at a higher speed, and the final or finishing touch may be made by a cutter constantly sharp, and the last cutter may take off a finer shaving, thus insuring the highest accuracy of form, dimension, and finish of the screw-thread. Several disks or tools with properly graduating lengths of cutters may be fastened together to operate simultaneously. The same stock and means for operating them may be used to support several tools, and as the tools herein described will constitute separate merchantable articles they varying according to the particular number of cuts to be made by each tool. The said tools become new articles of manufacture and are herein claimed as such.

The actuating devices for imparting a rotative step-by-step movement to the tool and for sliding it to and fro, as described, in the stock with relation to the work are novel; but this invention is not limited in all cases to exactly the mechanism shown for effecting these movements, and it will be obvious that these devices may be variously modified in shape without the exercise of invention and yet operate as described and be within the scope of my invention, and so also in the claims, in which the actuating devices for the tool appear specifically, the invention is not necessarily limited to the exact construction shown for the tool, so long as its cutters vary in length or present peripheral portions varying one from the other in thickness.

Having described my invention, what I claim, and desire to secure by Letters Patent, is—

1. As a new article of manufacture, a tool for grooving and threading metal consisting of a disk, having a series of integral cutters, each cutter having a heel, and interspaces between the cutters, the several cutters being of progressively-increasing radial length from the axis of the tool, the peripheral portion of each cutter being from its cutting edge to its heel substantially uniform both in thickness and radial length, and susceptible of sharpening by grinding on the acting face without change of profile, the peripheral portions of the series of cutters, however, varying in thickness and constructed to operate substantially as described.

2. In an apparatus for cutting screw-threads, the following instrumentalities, viz: a tool composed of a disk having at its periphery the profile of the thread to be produced and notched to form a series of integral cutters, said cutters varying in length as described, each cutter having a heel, a tool-stock, a movable bearing mounted therein, a pivot to receive the said tool rotatably, means to move the said bearing with its pivot and tool toward and from the work, a rest coöperating with the heel of each cutter to support it while in operation and means to retain the bearing forward with the cutter in operative position, substantially as described.

3. In an apparatus for cutting screw-threads, a stock, a bearing or slide mounted therein and containing a pivot, a tool mounted rotatably on said pivot, said tool having a series of cutters of varying length integral therewith, a rest mounted on said stock, a lever free to turn on said pivot, and fulcra for said lever, and means controlled by said lever to intermittently engage and turn said tool on said pivot, the movement of said lever in one direction withdrawing the cutter from the work, and in the opposite direction putting the cutter into operative position, with its heel against said rest, substantially as and for the purpose described.

4. In an apparatus for cutting screw-threads, a stock, a movable bearing mounted therein, and a pivot fitted therein, a tool mounted rotatably on said pivot said tool having a series of cutters of progressively-varying length thereon, a rest mounted on said stock, a lever free to turn on said pivot, and fulcra for said lever, and means controlled by said lever to intermittently engage and turn said tool on said pivot, the movement of said lever in one direction withdrawing the cutter from the work, and in the opposite direction putting the cutter into operative position, with its heel against the rest, and means to adjust the said rest, substantially as and for the purpose described.

5. In an apparatus for cutting screw-threads, a stock adapted to be attached to a tool-post of an engine-lathe, a bearing having a bolt or pivot, a tool having a series of cutters of progressively-greater radial length, said tool being mounted rotatably on said pivot, a rest mounted on said stock, and adapted to successively receive against it, and support the heels of the said cutters, means for locking said bearing or slide in said stock with the tool in operative position with relation to the work, and by reverse motion to disengage said locking device to release said bearing or slide, and means to intermittently turn said tool about said pivot to bring successively the several cutters of the series into operative position, substantially as and for the purpose set forth.

6. In an apparatus for cutting screw-threads, a tool having a series of cutters thereon, said cutters increasing progressively in radial length from the axis of said tool, said tool presenting at its periphery notches between the cutters, and a pivot to sustain said tool rotatably combined with a lever having a pawl, said pawl in the movement of said lever in one direction operatively engaging said tool and rotating it one step about its pivot substantially as described.

7. In an apparatus for cutting screw-threads, the following instrumentalities, viz: a tool-post, a stock carried by said tool-post, said stock having applied to it a movable bearing, a pivot mounted in said bearing and extended through the said stock, a tool mounted rotatively on said pivot, said tool having a series of cutters varying progressively in radial length, the peripheral portion of each tool being of substantially uniform thickness from its cutting edge to its heel, the peripheral portions of succeeding cutters of the series being of gradually less thickness, a lever to receive the pivot extended through said stock, and suitable fulcra for said lever, and a pawl carried by said lever, the said lever in the first part of its stroke in either direction turning on said bolt or pivot, and thereafter by contact with said fulcra moving the bolt or pivot with the lever, and effecting the sliding movement of the tool from or toward the work as may be, the said lever in one of its strokes causes said pawl to engage said tool and partially rotate it about said pivot sufficiently to place another cutter into operative position, substantially as described.

8. In an apparatus for cutting screw-threads, the following instrumentalities, viz: a stock adapted to be carried by the tool-carriage of an engine-lathe, said stock having applied to it a movable bearing, a pivot mounted in said bearing and extended through the said stock, a tool mounted rotatively on said pivot, said tool having a series of cutters varying progressively in radial lengths, the peripheral portion of each cutter being of substantially uniform thickness from its cutting edge to its heel, the peripheral portion of succeeding cutters of the series being of gradually less thickness, a lever to receive the pivot extended through said stock, and suitable fulcra for said lever, and a pawl carried by said lever, the said lever in the first part of its stroke in either direction turning on said pivot, and thereafter by contact with said fulcra moving the pivot with the lever and effecting the sliding movement of the tool from or toward the work as may be, the said lever in one of its strokes causing said pawl to engage said tool and partially rotate it about said pivot sufficiently to place another cutter into operative position, and a rest carried by said stock, said rest receiving upon it the heel of a cutter preparatory to the arrival of the tool in position to place and support a cutter in operative position with relation to the work, substantially as described.

9. In an apparatus for cutting screw-threads the following instrumentalities, viz: a stock adapted to be carried by the tool-carriage of an engine-lathe said stock having applied to it a bearing and a pivot extending through the said stock, a tool mounted rotatably on said pivot, said tool having a series of cutters varying progressively in radial length, the peripheral portion of each tooth being of substantially uniform thickness from its cutting edge to its heel, the peripheral portions of succeeding cutters of the series being of gradually less thickness, a lever to receive the pivot extended through said stock, and suitable fulcra for said lever, and a pawl carried by said lever, the said lever in the first part of its stroke in either direction turning on said pivot, and thereafter by contact with said fulcra moving the pivot with the lever and effecting the sliding movement of the tool from or toward the work as may be, the said lever in one of its strokes causing said pawl to engage said tool and partially rotate it about said pivot sufficiently to place another cutter into operative position, and a rest carried by said stock, said rest receiving upon it the heel of a cutter preparatory to the arrival of the tool in position to place a cutter in operative position with relation to the work, and a suitable locking device coöperating with said bearing to lock the same fixedly in its forward position to prevent any retreat of the cutter while operating to groove the work, substantially as described.

10. In an apparatus for cutting screw-threads, a tool having a series of separate cutters increasing progressively in radial length, a pivoted support on which said tool is rotatably mounted, means to bodily move said support and the tool thereon and to automatically effect a step-by-step rotation of the tool on its support, and a fixed rest against which the heel of each cutter is brought successively by movement of the tool into operative position, substantially as described.

11. In an apparatus for cutting screw-threads, a tool having a series of separate cutters increasing progressively in radial length, a reciprocable support on which the tool is rotatably mounted, means to rotate said tool on its support, a common actuating-lever, connections between it and said support and the means for rotating the tool, whereby swinging movement of said lever reciprocates the support and tool bodily and also effects a step-by-step rotation of the tool on said support, and a fixed rest against which the heel of each cutter is brought successively by the movement of the tool into operative position and supported during the cutting operation, substantially as described.

12. In a tool for cutting screw-threads, two or more disks, each having a series of cutters of progressively-increasing radial length from the axis of the tool, with intervening spaces between the cutters of each disk, each cutter having a heel adapted to rest on a support during cutting action, the cutting edges of all of the cutters being equidistant from the heels of the respective cutters, the peripheral portion of each cutter being from its cutting edge to its heel substantially uniform both in thickness and radial length as described and shown, said disks being secured to each other with adjacent cutters of each to act simultaneously, and the radial lengths of each series of cutters being so graduated, that the cutters of each disk shall be greater than the adjacent preceding cutters, as and for the purpose set forth.

HERMAN DOCK.

Witnesses:
R. H. WINTER,
JOHN E. ROBERTS.